United States Patent
Li et al.

(10) Patent No.: US 9,194,484 B2
(45) Date of Patent: Nov. 24, 2015

(54) SYSTEM AND METHOD FOR DETECTING LASH IN A TRANSMISSION AND CONTROLLING AN ENGINE AND/OR A MOTOR BASED ON LASH DETECTIONS

(71) Applicant: GM Global Technology Operations LLC, Detroit, MI (US)

(72) Inventors: Dongxu Li, Warren, MI (US); Timothy R. Stockdale, Woverine Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/934,270

(22) Filed: Jul. 3, 2013

(65) Prior Publication Data

US 2014/0309894 A1    Oct. 16, 2014

Related U.S. Application Data

(60) Provisional application No. 61/810,967, filed on Apr. 11, 2013.

(51) Int. Cl.
*F16H 57/12* (2006.01)
*F16H 57/00* (2012.01)

(52) U.S. Cl.
CPC ............... *F16H 57/12* (2013.01); *F16H 57/00* (2013.01); *F16H 2057/123* (2013.01)

(58) Field of Classification Search
CPC .... F16H 57/00; F16H 57/12; F16H 2057/123
See application file for complete search history.

(56) References Cited

U.S. PATENT DOCUMENTS

| | | |
|---|---|---|
| 4,361,060 A | 11/1982 | Smyth |
| 4,720,793 A | 1/1988 | Watanabe et al. |
| 5,337,874 A | 8/1994 | Oltean et al. |
| 5,508,923 A | 4/1996 | Ibamoto et al. |
| 5,559,705 A | 9/1996 | McClish et al. |
| 5,636,121 A | 6/1997 | Tsuyama et al. |
| 5,754,967 A | 5/1998 | Inoue et al. |
| 6,199,005 B1 | 3/2001 | Iwata |
| 6,278,915 B1 | 8/2001 | Deguchi et al. |
| 6,306,062 B1 | 10/2001 | Toukura et al. |
| 6,418,365 B1 | 7/2002 | Loffler et al. |
| 6,487,486 B1 | 11/2002 | Anderson |

(Continued)

FOREIGN PATENT DOCUMENTS

JP    2007298014 A    11/2007

OTHER PUBLICATIONS

U.S. Appl. No. 13/446,097, filed Apr. 13, 2012, Dongxu Li.

(Continued)

*Primary Examiner* — John Q Nguyen
*Assistant Examiner* — Michael Kerrigan

(57) ABSTRACT

A control system for a transmission of a vehicle includes a first angular rotation module, a second angular rotation module, and a lash module. The first angular rotation module determines a first angular rotation of a first shaft during a first predetermined period based on a first signal generated by a first shaft sensor. The second angular rotation module determines a second angular rotation of a second shaft during the first predetermined period based on a second signal generated by a second shaft sensor. The lash module selectively detects lash between gears of the transmission based on the first angular rotation and the second angular rotation.

22 Claims, 6 Drawing Sheets

(56) References Cited

U.S. PATENT DOCUMENTS

| | | |
|---|---|---|
| 6,513,611 B2 | 2/2003 | Ito et al. |
| 6,634,451 B2 | 10/2003 | Sakakiyama |
| 7,104,119 B1 | 9/2006 | Trapasso et al. |
| 7,110,869 B2 | 9/2006 | Tao et al. |
| 7,162,353 B2 | 1/2007 | Minowa et al. |
| 7,359,787 B2 | 4/2008 | Ono et al. |
| 7,400,993 B2 | 7/2008 | Shaver et al. |
| 7,445,581 B2 | 11/2008 | Cring |
| 7,559,259 B2 | 7/2009 | Fruhwirth et al. |
| 7,611,441 B2 | 11/2009 | Cring |
| 7,731,630 B2 | 6/2010 | League et al. |
| 7,788,010 B2 | 8/2010 | Kondo et al. |
| 7,856,337 B2 | 12/2010 | Kulczyk et al. |
| 7,920,950 B2 | 4/2011 | Nihanda |
| 7,942,228 B2 | 5/2011 | Fenker et al. |
| 8,046,142 B2 * | 10/2011 | Morris et al. .................. 701/51 |
| 8,296,026 B2 | 10/2012 | Maeda et al. |
| 8,296,038 B2 | 10/2012 | Verdejo et al. |
| 8,340,879 B2 | 12/2012 | Glatthaar et al. |
| 8,457,847 B2 | 6/2013 | Li |
| 8,532,890 B2 | 9/2013 | Wellenkotter et al. |
| 8,620,543 B2 | 12/2013 | Li et al. |
| 2006/0122755 A1 | 6/2006 | Segawa et al. |
| 2008/0011103 A1 | 1/2008 | Fruhwirth et al. |
| 2009/0181824 A1 | 7/2009 | Baeuerle |
| 2010/0279811 A1 | 11/2010 | Portell et al. |
| 2012/0078475 A1 | 3/2012 | Li et al. |
| 2012/0078476 A1 | 3/2012 | Li et al. |
| 2013/0124056 A1 | 5/2013 | Wellenkotter et al. |
| 2013/0218426 A1 | 8/2013 | Li et al. |
| 2013/0275015 A1 | 10/2013 | Li et al. |
| 2014/0207348 A1 | 7/2014 | Wakayama et al. |

OTHER PUBLICATIONS

U.S. Appl. No. 13/585,988, filed Aug. 15, 2012, Dongxu Li.
U.S. Appl. No. 13/934,299, filed Jul. 3, 2013, Dongxu Li.

* cited by examiner

US 9,194,484 B2

SYSTEM AND METHOD FOR DETECTING LASH IN A TRANSMISSION AND CONTROLLING AN ENGINE AND/OR A MOTOR BASED ON LASH DETECTIONS

CROSS-REFERENCE TO RELATED APPLICATIONS

This application claims the benefit of U.S. Provisional Application No. 61/810,967, filed on Apr. 11, 2013. The disclosure of the above application is incorporated herein by reference in its entirety.

The present disclosure is related to U.S. patent application Ser. No. 13/934,299 filed on Jul. 3, 2013. The entire disclosure of the application referenced above is incorporated herein by reference.

FIELD

The present disclosure relates to systems and methods for detecting lash in a transmission and for controlling an engine and/or a motor based on lash detections.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel mixture to produce drive torque. One or more electric motors may additionally or alternatively produce drive torque. Drive torque is provided to a transmission, and the transmission transfers torque to one or more wheels to propel the vehicle.

A dual clutch transmission (DCT) includes two clutches. Each clutch is associated with one independent input shaft. An odd gearset is coupled to one of the two input shafts and an even gearset is coupled to the other of the two input shafts. Generally, one of the two clutches is engaged while the other of the two clutches is not. In this manner, drive torque is transferred to one of the two input shafts and gearsets.

Gear synchronizers move along an output shaft of the DCT to mechanically couple gearsets to the output shaft. While torque is being transferred to one of the two input shafts and gearsets, another gearset that is coupled to the other one of the two input shafts may be mechanically coupled to the output shaft in anticipation of shifting to that gearset. A shift to that gearset can then be accomplished quickly by disengaging one clutch and engaging the other clutch.

SUMMARY

A control system for a transmission of a vehicle includes a first angular rotation module, a second angular rotation module, and a lash module. The first angular rotation module determines a first angular rotation of a first shaft during a first predetermined period based on a first signal generated by a first shaft sensor. The second angular rotation module determines a second angular rotation of a second shaft during the first predetermined period based on a second signal generated by a second shaft sensor. The lash module selectively detects lash between gears of the transmission based on the first angular rotation and the second angular rotation.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A transmission input shaft (TIS) receives drive torque when a clutch is engaged. Torque is transferred from the TIS to a transmission output shaft (TOS) via a selected gearset. The TOS transfers torque to a differential, and the differential transfers torque to wheels. A TIS sensor generates a first output signal based on rotation of the TIS. A TOS sensor generates a second output signal based on rotation of the TOS.

A transmission lash module determines a first amount of rotation of the TIS that occurs within a predetermined period based on the first output signal during the predetermined period. The transmission lash module determines a second amount of rotation of the TOS that occurs during the predetermined period based on the second output signal during the predetermined period. The transmission lash module detects lash in a transmission based on a difference between the first amount of rotation of the TIS and the second amount of rotation of the TOS (adjusted for the gear ratio of the selected gearset).

Lash may refer to a clearance between mating gears of the transmission. Alternatively, lash may refer to the amount of lost motion due to clearance or slackness between gears during a lash period between a first time when relative movement of the gears is reversed and a second time when contact between the gears is re-established. Additionally, lash may refer to the movement of the gears during the lash period. Lash may occur during a gear shift, when a driver tips into or out of an accelerator pedal, or when a hybrid vehicle switches modes by, for example, switching from using an engine to produce drive torque to using one or more motors to produce drive torque.

When a gear shift is not occurring, a difference between the first amount of rotation of the TIS and the second amount of rotation of the TOS (adjusted for the gear ratio of the selected gearset) should remain relatively constant. The transmission lash module according to the present disclosure detects lash in a transmission based on a change in the difference. For example, the transmission lash module may determine that lash occurs when the change in the difference is outside of a predetermined range and may determine that lash does not occur when the change in the difference is within the predetermined range.

Figure 1:
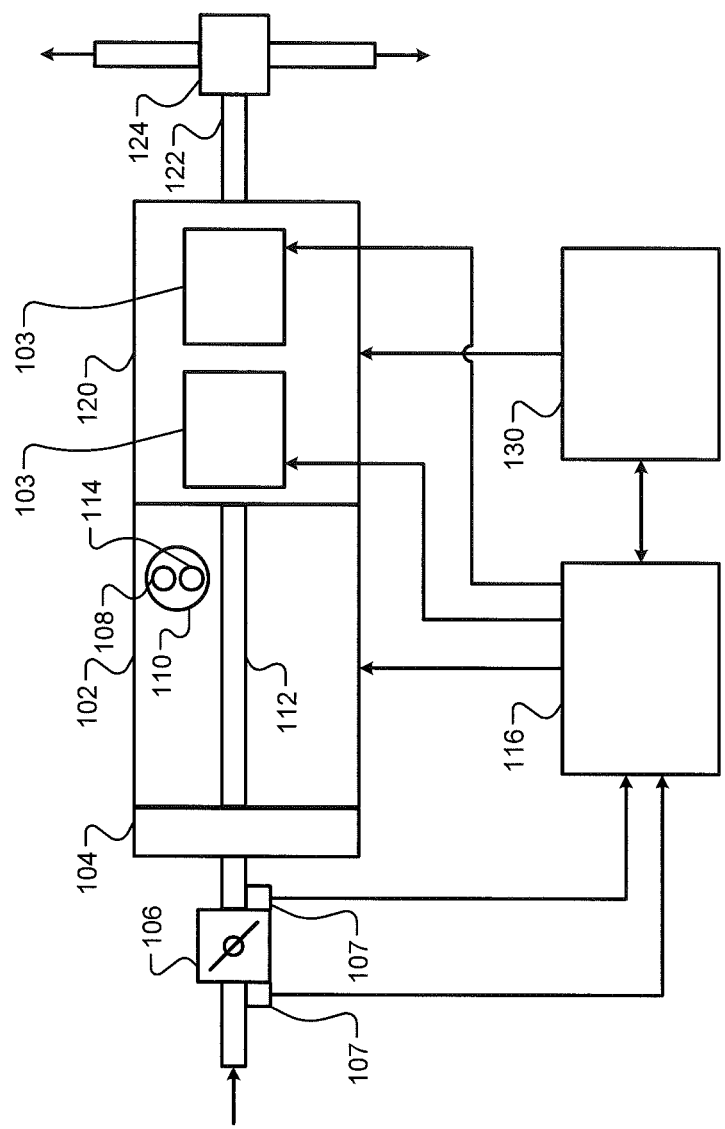
FIG. 1 is a functional block diagram an example powertrain system of a vehicle according to the present disclosure.

Referring now to FIG. 1, a functional block diagram of an example powertrain system of a vehicle is presented. The vehicle includes an engine 102 that generates drive torque. One or more electrical motors (or motor-generators) 103 may additionally or alternatively generate drive torque. While the engine 102 will be discussed as a gasoline type internal combustion engine (ICE), the engine 102 may include another suitable type of engine, such as a diesel type ICE, an electric type engine, or a hybrid type engine.

Air is drawn into the engine 102 through an intake manifold 104. The volume of air drawn into the engine 102 may be varied using a throttle valve 106. The position of the throttle valve 106 may be measured using one or more throttle position sensors 107. One or more fuel injectors 108 mix fuel with the air to form a combustible air/fuel mixture. The air/fuel mixture is combusted within one or more cylinders of the engine 102, such as cylinder 110. Although the engine 102 is depicted as including one cylinder, the engine 102 may include a greater number of cylinders.

The cylinder 110 includes a piston (not shown) that is mechanically linked to a crankshaft 112. One combustion event within the cylinder 110 may be described in four phases: an intake phase, a compression phase, a combustion (or expansion) phase, and an exhaust phase. During the intake phase, the piston moves toward a bottommost position within the cylinder 110. During the compression phase, the piston moves toward a topmost position and compresses the contents of the cylinder 110.

The combustion phase begins when, for example, spark from a spark plug 114 ignites the air/fuel mixture. The combustion of the air/fuel mixture drives the piston, and the piston drives rotation of the crankshaft 112. Exhaust resulting from combustion is expelled from the cylinder 110 during the exhaust phase. An engine control module (ECM) 116 controls the torque output of the engine 102 and/or the electric motors 103 based on one or more driver inputs and/or one or more other parameters.

The engine 102 transfers torque to a transmission 120 via the crankshaft 112. The transmission 120 receives torque output by the engine 102 via one or more clutches, such as a torque converter clutch (TCC) or multiple clutches in various types of transmissions. Torque input to the transmission 120 is selectively transferred to a transmission output shaft 122 based on a gear ratio engaged within the transmission 120. The transmission output shaft 122 transfers torque to a differential 124 that transfers torque to one or more wheels (not shown) of the vehicle. In various implementations, one or more other components may be implemented to transfer torque to other wheels of the vehicle. The electric motors 103 may be located in the transmission 120 as shown, or the electric motors 103 may be disposed at another location such as at the wheels of the vehicle.

A transmission control module (TCM) 130 controls the gear ratio of the transmission 120. The TCM 130 may control the gear ratio based on various shift maps, measured parameters (e.g., throttle opening and vehicle speed), and/or inputs from a driver (e.g., upshifts and downshifts). The ECM 116 and the TCM 130 may communicate with one another via a car area network (CAN), for example, to coordinate shifts within the transmission 120 and to share parameters. Gear ratio (or drive ratio) may be defined as the gear ratio of a gearset being used to transfer torque between a transmission input shaft and a transmission output shaft.

Figure 2:
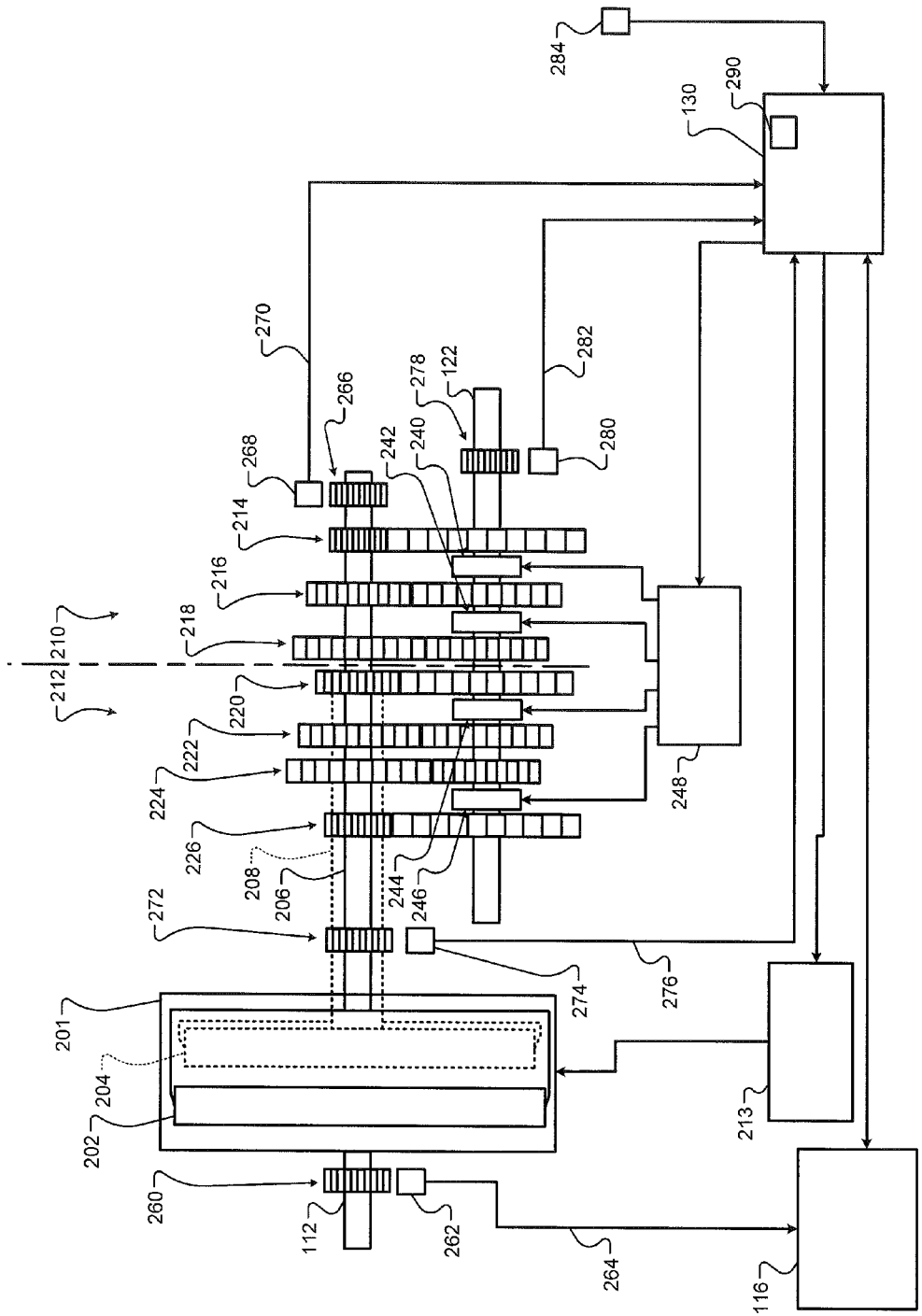
FIG. 2 is a diagram of an example dual clutch transmission (DCT) system according to the present disclosure.

Referring now to FIG. 2, an example diagram of a dual clutch transmission (DCT) system is presented. While the present disclosure will be discussed in the context of the transmission 120 being a DCT, the transmission 120 may be another type of transmission including one or more clutches that are controlled automatically (e.g., by the TCM 130), such as automatic transmissions including a TCC, auto-manual transmissions (AMTs), clutch-to-clutch transmissions, continuously variable transmissions (CVTs) (e.g., belt, chain, traction drive, etc.), hybrid transmissions, and other types of transmissions.

The transmission 120 may include a clutch pack 201 that includes two clutches: a first clutch 202 and a second clutch 204. The first clutch 202 is linked to a first input shaft 206, and the second clutch 204 is linked to a second input shaft 208. The first and second input shafts 206 and 208 may be implemented in a nested orientation. More specifically, one of the first and second input shafts 206 and 208 may be located within the other of the first and second input shafts 206 and 208. For example only, the first input shaft 206 may be located within the second input shaft 208 as shown in FIG. 2.

Generally, one of the first and second clutches 202 and 204 is engaged to transfer torque between the engine 102 and the transmission 120 at a given time. First and second return springs (not shown) bias the first and second clutches 202 and 204, respectively, toward disengagement. When the first clutch 202 is engaged, torque is transferred to an odd gearset 210 via the first input shaft 206. When the second clutch 204 is engaged, torque is transferred to an even gearset 212 via the second input shaft 208.

A clutch actuator module 213 may control the first and second clutches 202 and 204 based on signals from the TCM 130. For example only, the clutch actuator module 213 may control pressures of fluid applied to the first and second clutches 202 and 204 to control engagement, disengagement, and slip of the first and second clutches 202 and 204.

The odd gearset 210 is linked to and rotates with the first input shaft 206. The even gearset 212 is linked to and rotates with the second input shaft 208. The odd gearset 210 includes pairs of input gears and output gears (each pair referred to as a gearset) that provide odd numbered gear ratios.

For example only, the odd gearset 210 may include gearsets 214, 216, and 218 when the transmission 120 is capable of providing six gear ratios (i.e., a six speed transmission). The gearsets 214, 216, and 218 correspond to a first gear ratio, a third gear ratio, and a fifth gear ratio, respectively. The numerical label attributed to a given gear ratio (e.g., first-sixth) may increase as the gear ratio that it provides increases. While the example of six speeds is provided, the transmission 120 may include a greater or lesser number of gear ratios.

The even gearset 212 includes pairs of input gears and output gears (again, each pair referred to as a gearset) that provide even numbered gear ratios. For example only, the even gearset 212 may include gearsets 220, 222, and 224 when the transmission 120 is capable of providing six gear ratios. The gearsets 220, 222, and 224 correspond to a second gear ratio, a fourth gear ratio, and a sixth gear ratio, respectively. A reverse gearset 226 may also be provided with the even gearset 212.

As stated above, the gearsets 214-226 each include an input gear and an output gear. The input gears of the gearsets 214-218 are coupled to and rotate with the first input shaft 206. The input gears of the gearsets 220-226 are coupled to and rotate with the second input shaft 208. The input and output gears of the gearsets 214-226 are meshed, and rotation of the input gear of a gearset causes rotation of the output gear of the gearset.

The first and second clutches 202 and 204 control whether torque is transferred to the odd gearset 210 or to the even gearset 212, respectively. Synchronizers 240, 242, 244, and 246 slide along the transmission output shaft 122 and mechanically couple the output gears of the gearsets 214-224 to the transmission output shaft 122. A gear actuator module 248 may control positions and movement of the synchronizers 240-246 based on signals from the TCM 130. The TCM 130 controls the first and second clutches 202 and 204 and the synchronizers 240-246 to control the gear ratio of the transmission 120.

A first toothed wheel 260 is coupled to and rotates with the crankshaft 112. The first toothed wheel 260 includes a predetermined number of approximately equally spaced teeth. The teeth may be said to be approximately equally spaced to allow for manufacturing tolerances. A crankshaft position sensor 262 monitors rotation of the first toothed wheel 260 and generates a crankshaft position signal 264 based on the rotation of the crankshaft 112. More specifically, the crankshaft position sensor 262 may generate a predetermined pulse in the crankshaft position signal 264 each time a tooth of the first toothed wheel 260 passes the crankshaft position sensor 262. For example only, the crankshaft position sensor 262 may include a variable reluctance (VR) sensor, a Hall Effect sensor, or another suitable type of position sensor.

The ECM 116 determines a position of the crankshaft 112 (crankshaft position) based on the crankshaft position signal 264. The ECM 116 may also determine an engine speed based on the position of the crankshaft 112 and determine an engine acceleration based on the engine speed.

A second toothed wheel 266 is coupled to and rotates with the first input shaft 206. The second toothed wheel 266 includes a predetermined number of approximately equally spaced teeth. A first transmission input shaft (TIS) sensor 268 monitors rotation of the second toothed wheel 266 and generates a first TIS position signal 270 based on the rotation of the first input shaft 206. More specifically, the first TIS sensor 268 may generate a predetermined pulse in the first TIS position signal 270 each time a tooth of the second toothed wheel 266 passes the first TIS sensor 268. For example only, the first TIS sensor 268 may include a VR sensor, a Hall Effect sensor, or another suitable type of position sensor. In various implementations, the second toothed wheel 266 may be omitted, and the first TIS sensor 268 may generate the first TIS position signal 270 based on rotation of one of the input gears of the odd gearset 210.

A third toothed wheel 272 is coupled to and rotates with the second input shaft 208. The third toothed wheel 272 includes a predetermined number of approximately equally spaced teeth. A second TIS sensor 274 monitors rotation of the third toothed wheel 272 and generates a second TIS position signal 276 based on the rotation of the second input shaft 208. More specifically, the second TIS sensor 274 may generate a predetermined pulse in the second TIS position signal 276 each time a tooth of the third toothed wheel 272 passes the second TIS sensor 274. For example only, the second TIS sensor 274 may include a VR sensor, a Hall Effect sensor, or another suitable type of position sensor. In various implementations, the third toothed wheel 272 may be omitted, and the second TIS sensor 274 may generate the second TIS position signal 276 based on rotation of one of the input gears of the even gearset 212.

A fourth toothed wheel 278 is coupled to and rotates with the transmission output shaft 122. The fourth toothed wheel 278 includes a predetermined number of approximately equally spaced teeth. A transmission output shaft (TOS) sensor 280 monitors rotation of the fourth toothed wheel 278 and generates a TOS position signal 282 based on the rotation of the transmission output shaft 122. More specifically, the TOS sensor 280 may generate a predetermined pulse in the TOS position signal 282 each time a tooth of the fourth toothed wheel 278 passes the TOS sensor 280. For example only, the TOS sensor 280 may include a VR sensor, a Hall Effect sensor, or another suitable type of position sensor.

The vehicle may include one or more wheel sensors, such as wheel sensor 284. The wheel sensor 284 generates a wheel signal based on rotation of a wheel. A position of the wheel and a rotational speed of the wheel can be determined based on the wheel signal.

A transmission lash module 290 (see also FIG. 3) may determine a first amount of rotation of an input shaft of the transmission 120 experienced during a predetermined period based on the associated TIS position signal during the predetermined period. The transmission lash module 290 may also determine a second amount of rotation of the second input shaft 208 experienced during the predetermined period based on the second TIS position signal 276 during the predetermined period.

When a gear shift not occurring and the input and output gears of the selected one of the gearsets 214-226 are in contact, a difference between the first and second amount (adjusted for the ratio between the two shafts) should remain relatively constant. Therefore, the transmission lash module 290 detects lash between the input and output gears of the selected one of the gearsets 214-226 based on the difference when a gear shift is not occurring.

Figure 3:
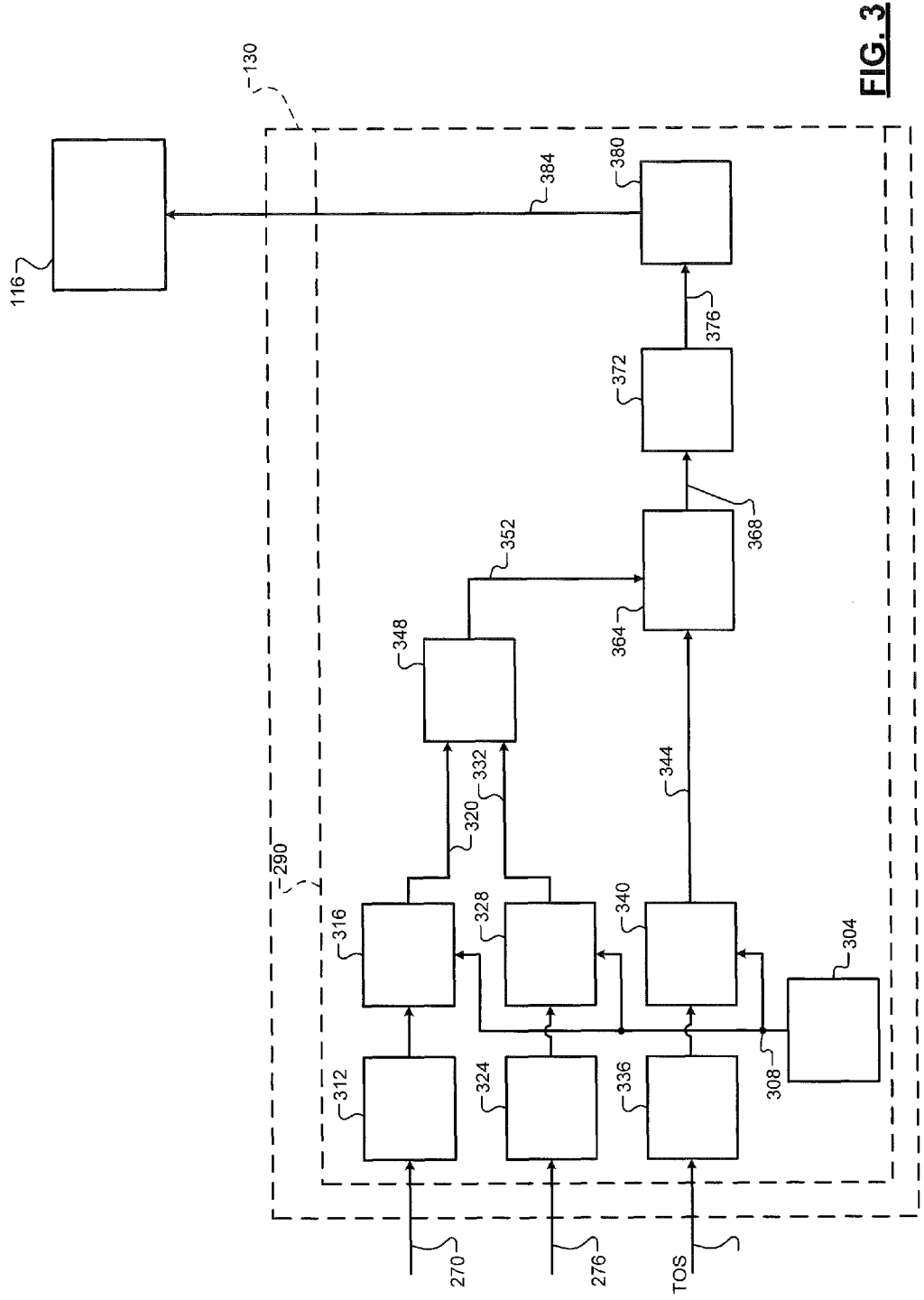
FIG. 3 is a functional block diagram of an example control system according to the present disclosure.

Referring now to FIG. 3, a functional block diagram of an example control system is presented. An updating module 304 generates an update signal 308 each time a predetermined period passes. For example only, the predetermined period may be approximately 25 milliseconds (ms) or another suitable period.

A first time stamping module 312 receives the first TIS position signal 270 and generates a time stamp each time a pulse is detected in the first TIS position signal 270. When the update signal 308 is generated, a first angular rotation module 316 determines an angular rotation of the first input shaft 206. The angular rotation of the first input shaft 206 will be referred to as a first TIS rotation 320 and may correspond to an amount of angular rotation (e.g., in degrees) of the first input shaft 206 during the predetermined period before the generation of the update signal 308. The first angular rotation module 316 determines the first TIS rotation 320 based on the timestamps generated by the first time stamping module 312 during the predetermined period before the generation of the update signal 308.

A second time stamping module 324 receives the second TIS position signal 276 and generates a time stamp each time a pulse is detected in the second TIS position signal 276. When the update signal 308 is generated, a second angular rotation module 328 determines an angular rotation of the second input shaft 208. The angular rotation of the second input shaft 208 will be referred to as a second TIS rotation 332 and may correspond to an amount of angular rotation (e.g., in degrees) of the second input shaft 208 during the predetermined period before the generation of the update signal 308.

The second angular rotation module 328 determines the second TIS rotation 332 based on the timestamps generated by the second time stamping module 324 during the predetermined period before the generation of the update signal 308.

A third time stamping module 336 receives the TOS position signal 282 and generates a time stamp each time a pulse is detected in the TOS position signal 282. When the update signal 308 is generated, a third angular rotation module 340 determines an angular rotation of the transmission output shaft 122. The angular rotation of the transmission output shaft 122 will be referred to as a TOS rotation 344 and may correspond to an amount of angular rotation (e.g., in degrees) of the transmission output shaft 122 during the predetermined period before the generation of the update signal 308. The third angular rotation module 340 determines the TOS rotation 344 based on the timestamps generated by the third time stamping module 336 during the predetermined period before the generation of the update signal 308.

A selecting module 348 may select one of the first and second TIS rotations 320 and 332 and set a selected TIS rotation 352 equal to the selected one of the first and second TIS rotations 320. The selecting module 348 may select the first TIS rotation 320 or the second TIS rotation 332 based on which one of the first and second clutches 202 and 204 is engaged. For example, when the first clutch 202 is engaged, the selecting module 348 may select the first TIS rotation 320. The selecting module 348 may select the second TIS rotation 332 when the second clutch 204 is engaged. A clutch control module 356 may generate a clutch signal 360 that indicates which one of the first and second clutches 202 and 204 is engaged.

A difference module 364 determines a rotational difference 368 based on the selected TIS rotation 352, the TOS rotation 344, and the present gear ratio of the transmission 120. For example only, the difference module 364 may set the rotational difference 368 using the equation:

$$\emptyset = TIS - (r_{gr} * TOS),$$

where $\emptyset$ is the rotational difference 368, TIS is the selected TIS rotation 352, $r_{gr}$ is the present gear ratio of the transmission 120, and TOS is the TOS rotation 344. While the rotational difference 368 is discussed as being determined based on TIS rotation, TOS rotation, and the gear ratio of the transmission 120, rotational amounts of one or more other shafts may and the ratio between the two shafts may be used, such as crankshaft rotation and TOS rotation or another suitable combination of shafts. The above equation may be re-written more generally as:

$$\emptyset = Shaft1 - (Ratio * Shaft2),$$

where $\emptyset$ is the rotational difference 368, Shaft1 is the rotation of a first shaft experienced during a predetermined period, Shaft2 is the rotation of a second shaft experienced during the predetermined period, and Ratio is the ratio between the first and second shafts. In hybrid vehicles, rotation of the output shaft of one or more electric motors may be measured (e.g., using a resolver or an encoder) and used.

When the input and output gears of the selected one of the gearsets 214-226 are in contact and a gear shift is not occurring, the rotational difference 368 should remain approximately constant. When a gear shift is not occurring, a change in the rotational difference 368 may therefore indicate lash between the input and output gears of the selected one of the gearsets 214-226.

A change module 372 determines a change 376 in the rotational difference 368 based on the rotational difference 368 and a previous (e.g., last) value of the rotational difference 368. For example, the change module 372 determines the change 376 based on a difference between the rotational difference 368 and the previous value of the rotational difference 368.

A lash module 380 indicates whether lash exists between the input and output gears of the selected one of the gearsets 214-226 based on the change 376. For example, the lash module 380 may indicate that no lash exists between the input and output gears of the selected one of the gearsets 214-226 when the change 376 is within a first range around zero. The lash module 380 may indicate that lash exists between the input and output gears of the selected one of the gearsets 214-226 when the change 376 is greater than an upper limit of the first range or less than a lower limit of the first range. The upper and lower limits of the first range may be predetermined and/or may be equal in magnitude. In various implementations, absolute value of the change 376 may be used, and the lash module 380 may indicate that slip occurs when the absolute value of the change 376 is greater than the upper limit of the first range. Alternatively, the lash module 380 may anticipate whether the change 376 will increase or decrease when lash occurs, and therefore whether to use the upper or lower limit to detect lash, based on the throttle position, an engine torque, and/or a motor torque.

The lash module 380 may determine the upper and lower limits based on an average value of the change 376 over a predetermined period before the change 376 is determined. For example, the lash module 380 may set the upper limit equal to a sum of the average value of the change 376 and a positive value of an offset. Similarly, the lash module 380 may set the lower limit equal to a sum of the average of the change 376 and a negative value of the offset. The offset may be predetermined based on a maximum value of the change 376 during a maximum amount of engine torque variation when there is no lash between the input and output gears of the selected one of the gearsets 214-226. For example, the offset may be predetermined during calibration when the vehicle is equipped with instrumentation that detects lash between the input and output gears of the selected one of the gearsets 214-226.

In various implementations, the lash module 380 may indicate that lash exists between the input and output gears of the selected one of the gearsets 214-226 when an absolute value of a derivative of the change 376 with respect to time is greater than a first threshold. The first threshold may be predetermined based on a maximum absolute value of the derivative of the change 376 with respect to time when there is no lash between the input and output gears of the selected one of the gearsets 214-226. For example, the first threshold may be predetermined during calibration when the vehicle is equipped with instrumentation that detects lash between the input and output gears of the selected one of the gearsets 214-226.

The lash module 380 generates a lash signal 384 that indicates whether lash exists between the input and output gears of the selected one of the gearsets 214-226. The lash signal 384 may also indicate when lash starts and ends. The lash module 380 may determine that lash ends when an absolute value of the change 376 is greater than a second threshold. The lash module 380 may determine the second threshold based on a sum of the average value of the change 376 before a lash event (e.g., tip-in or tip-out) and a difference in the average value of the change 376 before and after previous lash events. For example, the lash module 380 may determine a first average value of the change 376 before lash occurs and a second average value of the change 376 after lash occurs. The lash module 380 may then determine when lash ends in a subsequent lash event based on a sum of the average value of the change 376 before the subsequent lash event and the difference between the first and second average values.

The difference between the first and second average values may change depending on the gear ratio of the selected one of the gearsets 214-226. Thus, the lash module 380 may select the difference used to determine the second threshold based on the gear ratio of the selected one of the gearsets 214-226. In addition, the difference between the first and second average values is related to the amount of clearance between the input and output gears of the selected one of the gearsets 214-226. This amount of clearance may change over time due to, for example, mechanical wear. Thus, the lash module 380 may repeatedly determine the difference between the first and second average values to account for changes in the amount of clearance between the input and output gears when determining when lash starts and ends.

The ECM 116 may adjust a desired transmission input torque, such as a desired engine torque or a desired motor torque, based on whether lash is detected. For example, during an accelerator pedal tip-in, the ECM 116 may increase the desired transmission input torque to a first torque level before lash is detected and then maintain the desired transmission input torque at the first torque level. The first torque level may reverse the direction of the relative movement of the input and output gears of the selected one of the gearsets 214-226 during the tip-in and prevent driveline bump when the transmission input torque passes through a lash zone. The first torque level may be predetermined. Alternatively, the ECM 116 may determine the first torque level during a previous tip-in based on, for example, the transmission input torque at the start of lash detection. The ECM 116 may maintain the desired transmission input torque at the first torque level when lash is detected, and then increase the desired transmission input torque to a second torque level when the lash ends. The second torque level may be a desired torque level corresponding to the amount of tip-in.

During an accelerator pedal tip-out, the ECM 116 may decrease the desired transmission input torque to a third torque level before lash is not detected and then maintain the desired transmission input torque at the third torque level. The third torque level may reverse the direction of the relative movement of the input and output gears of the selected one of the gearsets 214-226 during the tip-out and prevent driveline bump when the transmission input torque passes through a lash zone. The third torque level may be predetermined. Alternatively, the ECM 116 may determine the third torque level during a previous tip-out based on, for example, the transmission input torque at the start of lash detection. The ECM 116 may maintain the desired transmission input torque at the third torque level when lash is detected, and then decrease the desired engine torque to a fourth torque level when the lash ends. The fourth torque level may be a minimum torque level such as zero or a torque level that prevents an engine stall.

Figure 4:
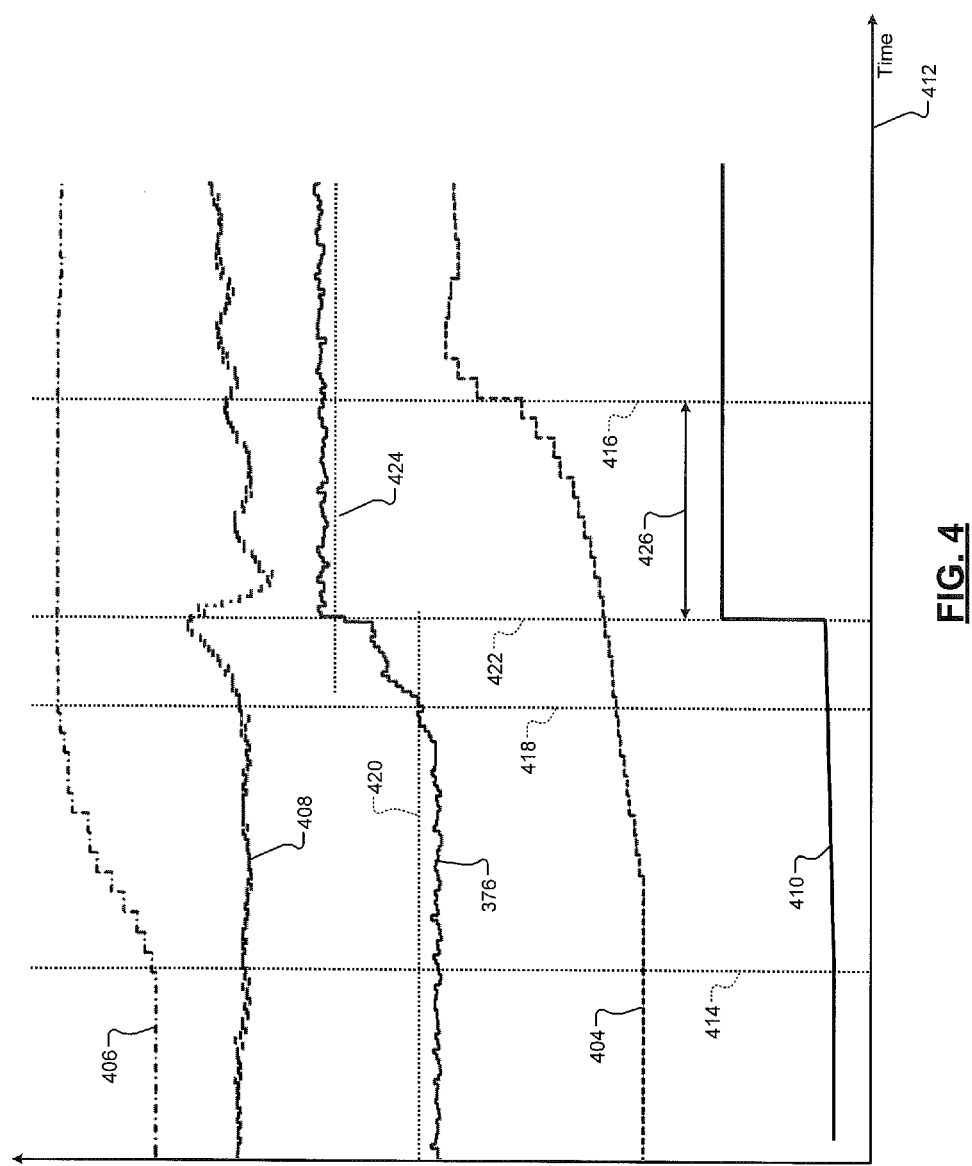
FIG. 4 is an example graph of a throttle position, a change in a rotational difference between transmission input and output shafts, an engine output torque, and a desired engine torque during an accelerator pedal tip-in according to the present disclosure.

Detecting lash and adjusting engine torque based on lash detections may reduce torque delays and driveline bumps relative to adjusting engine torque in an open-loop manner to avoid abrupt engine torque increases or decreases through a lash zone. This reduction in torque delays associated with adjusting engine torque based on lash detections is illustrated in FIG. 4. A reduction in torque delays associated with adjusting other transmission input torques, such as a motor torque in a hybrid vehicle, may be achieved by adjusting the other transmission input torques based on lash detections in a similar manner.

Referring now to FIG. 4, an example graph illustrates the change 376 in the rotational difference 368, an engine output torque 404, a throttle position 406, a transmission input shaft speed 408, and a desired engine torque 410 over time 412 after a tip-in. At 414, the throttle position 406 starts to increase in response to the tip-in. In turn, the engine output torque 404 is adjusted in an open-loop manner to avoid abrupt engine torque increases through a lash zone. For example, the engine output torque 404 may be increased at a first rate for a predetermined period after the tip-in. The first rate may be predetermined and may be less than necessary to prevent increasing the engine output torque 404 to a torque level that causes driveline bump when lash occurs. Then, at 416, the predetermined period expires. Therefore, the engine output torque 404 may be increased at a second rate that is greater than the first rate.

In contrast, a system and method according to the present disclosure adjusts the desired engine torque 410 based on whether lash is detected. At 414, the system and method may start to increase the desired engine torque 410 to the first torque level. At 418, the change 376 in the rotational difference 368 is greater than a first threshold 420 (e.g., the upper limit discussed above with reference to FIG. 3). Thus, the system and method detects lash and may maintain the desired engine torque 410 less than or equal to the first torque level. At 422, the change 376 is greater than a second threshold 424 (e.g., the second threshold discussed above with reference to FIG. 3). Thus, the system and method determines that the lash ends and increases the desired engine torque based on the throttle position 406. For example, the system and method may increase the desired engine torque to the second torque level at a second rate, which may be greater than the first rate. By increasing the desired engine torque at 410 when the lash ends instead of waiting for a predetermined period to expire after tip-in, the system and method according to the present disclosure avoids a delay 426 in the response of the engine output torque 404. The delay 426 is a period between 420, when lash ends and engine torque may be increased without causing driveline bump, and 416, when the engine output torque 404 is increased at the second rate. In addition, the system and method may record the level of the engine output torque 404 and/or the desired engine torque 410 at 418 when lash is initially detected. Then, during subsequent tip-ins, the system and method may then increase the desired engine torque 410 to the recorded level at the second rate before lash is detected.

Figure 5:
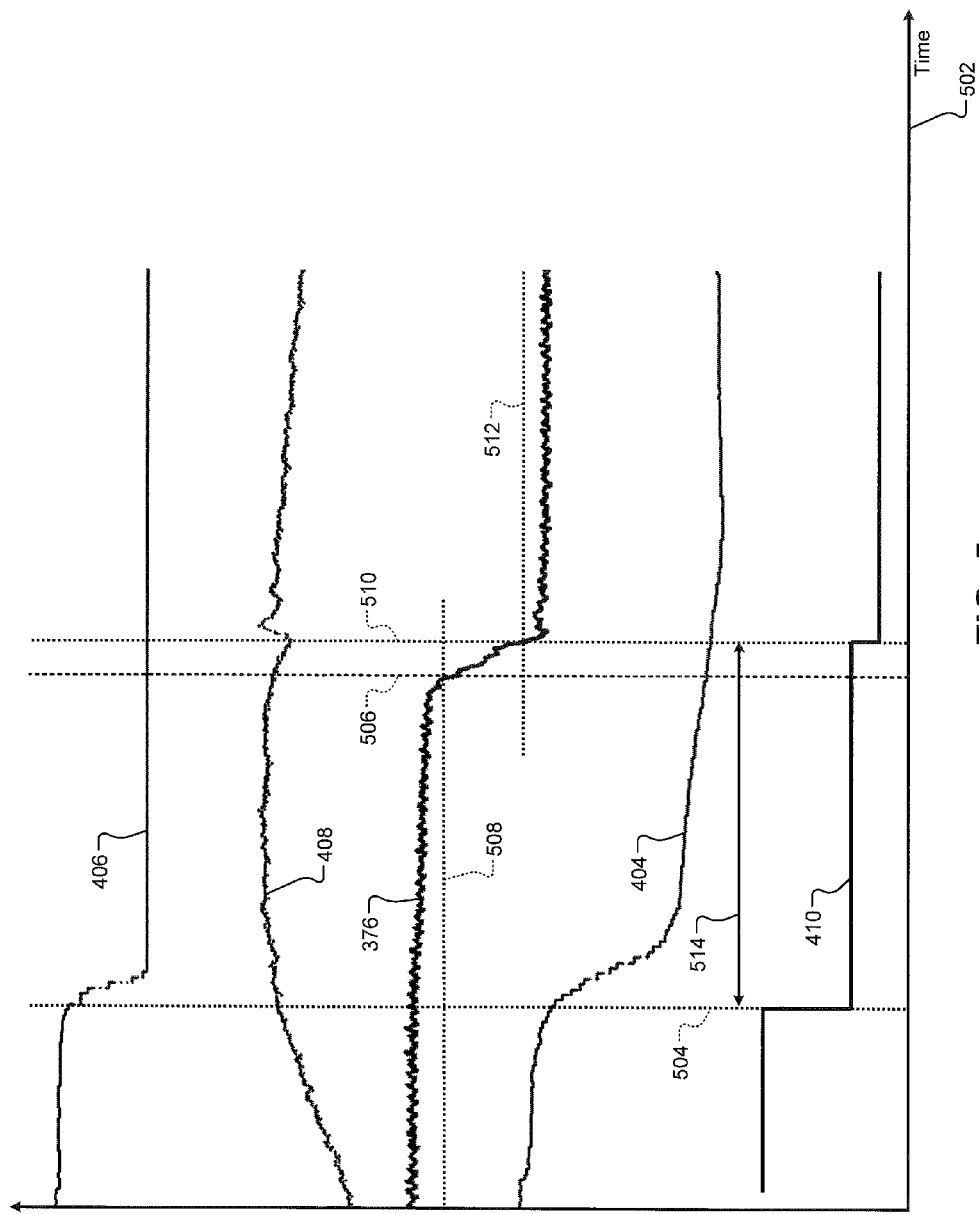
FIG. 5 is an example graph of a throttle position, a change in a rotational difference between transmission input and output shafts, an engine output torque, and a desired engine torque during an accelerator pedal tip-out according to the present disclosure.

Referring now to FIG. 5, an example graph illustrates the change 376 in the rotational difference 368, the engine output torque 404, the throttle position 406, the transmission input shaft speed 408, and the desired engine torque 410 over time 502 after a tip-out. At 504, the throttle position starts to decrease in response to the tip-out. In turn, the engine output torque 404 is adjusted in an open-loop manner to avoid abrupt engine torque decreases through a lash zone. For example, the engine output torque 404 may be gradually decreased at various rates after the tip-out until the engine output torque 404 is equal to a desired engine torque corresponding to the throttle position 406. The various rates may be predetermined and may be less than necessary to prevent driveline bump when the engine output torque 404 passes through the lash zone.

In contrast, a system and method according to the present disclosure adjusts the desired engine torque 410 based on whether lash is detected. At 504, the system and method decreases the desired engine torque 410 in response to the tip-out. For example, the system and method may decrease the desired engine torque 410 to the third torque level and/or at a first rate. The first rate may be greater than the various rates at which the engine output torque 404 is decreased. At 506, the change 376 in the rotational difference 368 is less than a first threshold 508 (e.g., the lower limit discussed above with reference to FIG. 3). Thus, the system and method detects lash and may maintain the desired engine torque 410 at the third torque level.

At 510, the change 376 is less than a second threshold 512 (e.g., a negative value of the second threshold discussed above with reference to FIG. 3). Thus, the system and method determines that lash ends and again decreases the desired engine torque 410. For example, the system and method may decrease the desired engine torque 410 to the fourth torque level and/or at the first rate. Notably, the lash is detected only during the period from 506 to 510. However, since the engine output torque 404 is controlled in an open-loop manner independent from lash detections, the engine output torque 404 is gradually decreased over the period from 504 to 510, which is greater than the period from 506 to 510. Therefore, by decreasing the desired engine torque 410 at the first rate at 504 instead of gradually decreasing engine torque between 504 and 510, the system and method according to the present disclosure avoids a delay 514 in the response of the engine output torque 404. The delay 514 is a period from 504, when the throttle position 406 starts to decrease and the engine output torque 404 is initially decreased, to 510, when the lash ends. In addition, the system and method may record the level of the engine output torque 404 and/or the desired engine torque 410 at 506 when lash is initially detected. Then, during subsequent tip-outs, the system and method may then increase the desired engine torque 410 to the recorded level at the first rate before lash is detected.

Figure 6:
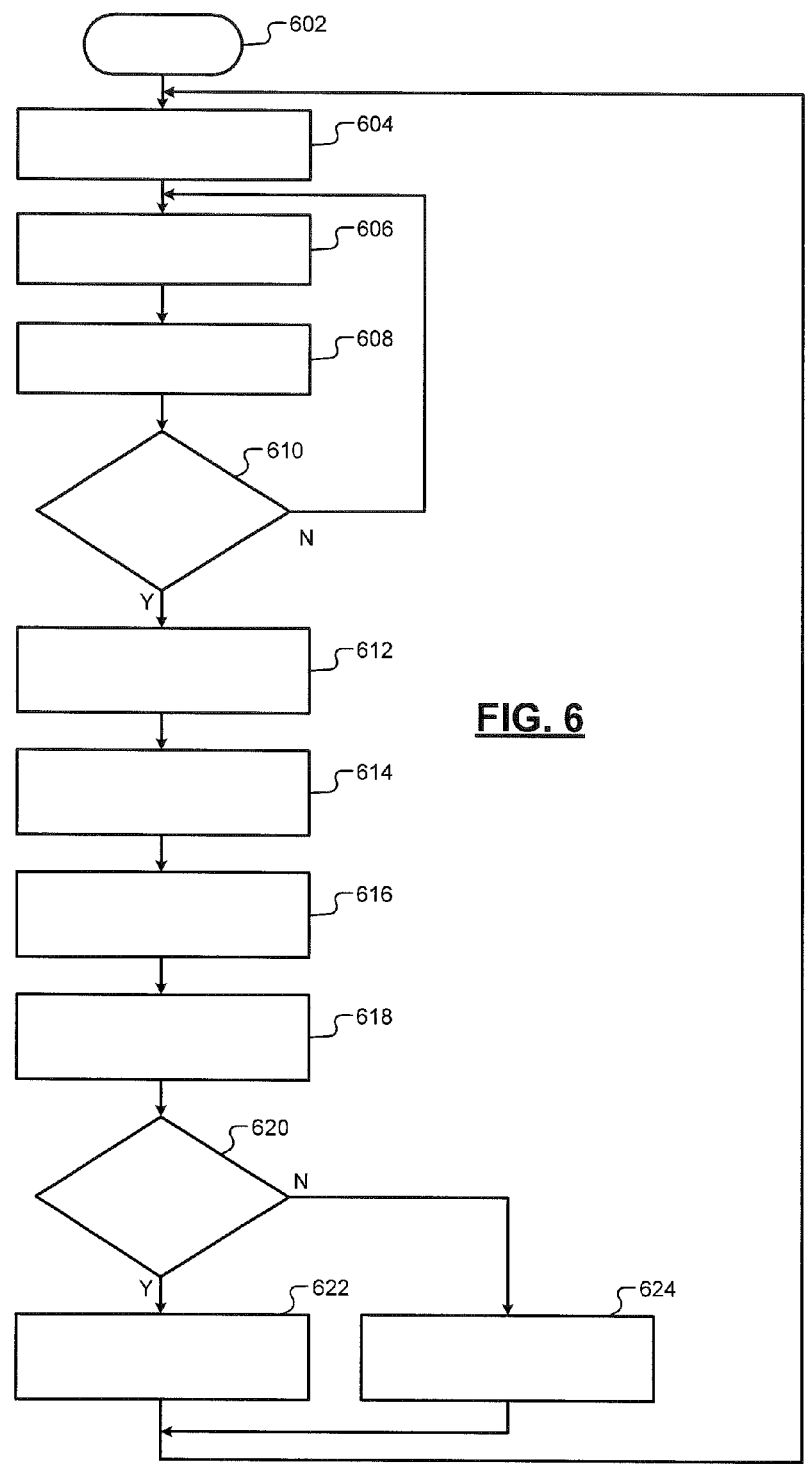
FIG. 6 is a flowchart depicting an example method of detecting lash in a transmission and controlling an engine and/or a motor based on lash detections according to the present disclosure.

Referring now to FIG. 6, an example method of detecting lash in a transmission and controlling the torque output of the engine 102 and/or the electric motors 103 based on lash detections is illustrated. The method begins at 602. At 604, the updating module 304 resets a timer. At 606, the updating module 304 may increment the timer.

At 608, the first time stamping module 312 generates time stamps based on the first TIS position signal 270, the second TIS sensor 274 generates time stamps based on the second TIS position signal 276, and the third time stamping module 336 generates time stamps based on the TOS position signal 282. At 610, the updating module 304 determines whether the value of the timer is greater than the predetermined period (e.g., 25 ms). If the value of the timer is greater than the predetermined period, the method continues at 612. Otherwise, the method returns to 606.

At 612, the first angular rotation module 316 determines the first TIS rotation 320, the second angular rotation module 328 determines the second TIS rotation 332, and the third angular rotation module 340 determines the TOS rotation 344. The first angular rotation module 316 determines the first TIS rotation 320 based on the timestamps generated by the first time stamping module 312 during the predetermined period. The second angular rotation module 328 determines the second TIS rotation 332 based on the timestamps generated by the second time stamping module 324 during the predetermined period. The third angular rotation module 340 determines the TOS rotation 344 based on the timestamps generated by the third time stamping module 336 during the predetermined period. An example way of determining an amount of rotation of a shaft during a predetermined period that may be employed by the first and second angular rotation modules 316 and 328 is described in commonly assigned U.S. patent application Ser. No. 12/892,832, filed on Sep. 28, 2010 (now U.S. Pat. No. 8,457,847), which is incorporated by reference in its entirety.

At 614, the selecting module 348 may select one of the first TIS rotation 320 and the second TIS rotation 332 as the selected TIS rotation 352. The selecting module 348 selects one of the first TIS rotation 320 and the second TIS rotation 332 based on which one of the first and second clutches 202 and 204 is engaged. For example, the selecting module 348 selects the first TIS rotation 320 when the first clutch 202 is engaged, and the selecting module selects the second TIS rotation 332 when the second clutch 204 is engaged.

At 616, the difference module 364 determines the rotational difference 368. The difference module 364 may determine the rotational difference 368 based on the selected TIS rotation 352, the gear ratio, and the TOS rotation 344. For example, the difference module 364 may set the rotational difference 368 using the equation:

$$\emptyset = TIS - (r_{gr} * TOS),$$

where $\emptyset$ is the rotational difference 368, TIS is the selected TIS rotation 352, $r_{gr}$ is the present gear ratio of the transmission 120, and TOS is the TOS rotation 344. Again, while the rotational difference 368 is discussed as being determined based on TIS rotation, TOS rotation, and the gear ratio of the transmission 120, rotational amounts of one or more other shafts may and the ratio between the two shafts may be used, for example, using the equation:

$$\emptyset = Shaft1 - (Ratio * Shaft2),$$

where $\emptyset$ is the rotational difference 368, Shaft1 is the rotation of a first shaft experienced during a predetermined period, Shaft2 is the rotation of a second shaft experienced during the predetermined period, and Ratio is the ratio between the first and second shafts. In hybrid vehicles, rotation of the output shaft of one or more electric motors may be measured (e.g., using a resolver or an encoder) and used.

At 618, the change module 372 determines the change 376 in the rotational difference 368 based on a difference between the rotational difference 368 and the previous value of the rotational difference 368. At 620, the lash module 380 may determine whether the change 376 is outside of the first range. Alternatively, the lash module 380 may determine whether an absolute value of a derivative of the change 376 with respect to time is greater than the first threshold. If the change 376 is outside of the first range or the absolute value of the derivative of the change 376 is greater than the first threshold, the lash module 380 continues at 622. Otherwise, the lash module 380 continues at 624. At 622, the lash module 380 detects lash between the input and output gears of the selected one of the gearsets 214-226 of the transmission 120. At 624, the lash module 380 does not detect lash between the input and output gears of the selected one of the gearsets 214-226.

The desired torque output of the engine 102 and/or the electric motors 103 may be adjusted when lash is detected. For example, the desired torque output may be held at a fixed value. Alternatively, the desired torque output may be adjusted at a first rate when lash is not detected, and the desired torque output may be adjusted at a second rate that is less than the first rate when lash is detected. The second rate may be selected to prevent driveline bump when contact between the gears is re-established.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A control system for a transmission of a vehicle, comprising:
   a first angular rotation module that determines a first angle through which a first shaft on an input side of the transmission rotates during a first predetermined period based on a first signal generated by a first shaft sensor;
   a second angular rotation module that determines a second angle through which a second shaft on an output side of the transmission rotates during the first predetermined period based on a second signal generated by a second shaft sensor;
   a lash module that selectively detects lash between gears of the transmission based on the first angle and the second angle; and an engine control module that adjusts a desired transmission input torque based on whether lash is detected.

2. The control system of claim 1 wherein the first shaft is a transmission input shaft (TIS), the first shaft sensor is a TIS sensor, the second shaft is a transmission output shaft (TOS), and the second shaft sensor is a TOS sensor.

3. The control system of claim 2 further comprising:
   a difference module that determines a difference in rotation of the TIS and the TOS during the first predetermined period based on the first angle, the second angle, and a gear ratio of the transmission,
   wherein the lash module selectively detects lash between gears of the transmission based on the difference.

4. The control system of claim 3 wherein the difference module sets the difference based on the first angle minus a value equal to a product of the second angle and the gear ratio.

5. The control system of claim 3 further comprising:
   a change module that determines a change in the difference based on the difference and a previous value of the difference,
   wherein the lash module selectively detects lash between gears of the transmission based on the change.

6. The control system of claim 5 wherein:
   the lash module determines a first value based on an average value of the change over a second predetermined period before the change is determined; and
   the lash module selectively detects lash between gears of the transmission when the change is one of greater than and less than the first value.

7. The control system of claim 5 wherein the lash module selectively detects lash between gears of the transmission when an absolute value of a derivative of the change is greater than a predetermined value.

8. The control system of claim 2 further comprising:
   a third angular rotation module that determines a third angle through which a second TIS rotates during the first predetermined period based on a third signal generated by a second TIS sensor,
   wherein the lash module selectively detects lash between gears of the transmission based on the second angle and a selected one of the first angle and the third angle.

9. The control system of claim 8 further comprising a selecting module that selects one of the first angle and the third angle based on whether a clutch is coupled to the TIS or to the second TIS.

10. The control system of claim 2 wherein the engine control module:
    adjusts the desired transmission input torque to a first torque level before lash is detected between gears of the transmission during a lash event, wherein the first torque level is selected to prevent driveline bump when lash occurs;
    maintains the desired transmission input torque at the first torque level when lash is detected between gears of the transmission; and
    adjusts the desired transmission input torque to a second torque level when lash is no longer detected between gears of the transmission.

11. The control system of claim 1 wherein the first shaft is a crankshaft, the first shaft sensor is a crankshaft position sensor, the second shaft is a transmission output shaft (TOS), and the second shaft sensor is a TOS sensor.

12. A method for controlling a transmission of a vehicle, comprising:
    determining a first angle through which a first shaft on an input side of the transmission rotates during a first predetermined period based on a first signal generated by a first shaft sensor;
    determining a second angle through which a second shaft on an output side of the transmission rotates during the first predetermined period based on a second signal generated by a second shaft sensor;
    selectively detecting lash between gears of the transmission based on the first angle and the second angle; and
    adjusting a desired transmission input torque based on whether lash is detected.

13. The method of claim 12 wherein the first shaft is a transmission input shaft (TIS), the first shaft sensor is a TIS sensor, the second shaft is a transmission output shaft (TOS), and the second shaft sensor is a TOS sensor.

14. The method of claim 13 further comprising:
determining a difference in rotation of the TIS and the TOS during the first predetermined period based on the first angle, the second angle, and a gear ratio of the transmission; and
selectively detecting lash between gears of the transmission based on the difference.

15. The method of claim 14 further comprising setting the difference based on the first angle minus a value equal to a product of the second angle and the gear ratio.

16. The method of claim 14 further comprising:
determining a change in the difference based on the difference and a previous value of the difference; and
selectively detecting lash between gears of the transmission based on the change.

17. The method of claim 16 further comprising:
determining a first value based on an average value of the change over a second predetermined period before the change is determined; and
selectively detecting lash between gears of the transmission when the change is one of greater than and less than the first value.

18. The method of claim 16 further comprising selectively detecting lash between gears of the transmission when an absolute value of a derivative of the change is greater than a predetermined value.

19. The method of claim 13 further comprising:
determining a third angle through which a second TIS rotates during the first predetermined period based on a third signal generated by a second TIS sensor; and
selectively detecting lash between gears of the transmission based on the second angle and a selected one of the first angle and the third angle.

20. The method of claim 19 further comprising selecting one of the first angle and the third angle based on whether a clutch is coupled to the TIS or to the second TIS.

21. The method of claim 13 further comprising:
adjusting the desired transmission input torque to a first torque level before lash is detected between gears of the transmission during a lash event, wherein the first torque level is selected to prevent driveline bump when lash occurs;
maintaining the desired transmission input torque at the first torque level when lash is detected between gears of the transmission; and
adjusting the desired transmission input torque to a second torque level when lash is no longer detected between gears of the transmission.

22. The method of claim 12 wherein the first shaft is a crankshaft, the first shaft sensor is a crankshaft position sensor, the second shaft is a transmission output shaft (TOS), and the second shaft sensor is a TOS sensor.

* * * * *